Sept. 23, 1969    D. G. COSGROVE ET AL    3,469,183
METHOD AND APPARATUS FOR DETERMINING LINEARITY CHARACTERISTICS
OF VOLTAGE READ-OUT INSTRUMENTS UTILIZING AN
ENVELOPE SERIES OF PULSES
Filed Oct. 6, 1966    2 Sheets-Sheet 1

ELDON W. BIELSS
DONALD G. COSGROVE
LEROY E. ERWIN

INVENTORS

BY *Charles E. Woodward*
ATTORNEY

ELDON W. BIELSS
DONALD G. COSGROVE
LEROY E. ERWIN

INVENTORS

United States Patent Office 3,469,183
Patented Sept. 23, 1969

3,469,183
METHOD AND APPARATUS FOR DETERMINING LINEARITY CHARACTERISTICS OF VOLTAGE READ-OUT INSTRUMENTS UTILIZING AN ENVELOPE SERIES OF PULSES
Donald G. Cosgrove and Le Roy E. Erwin, Fort Worth, and Eldon W. Bielss, Weatherford, Tex., assignors to General Dynamics Corporation, a corporation of Delaware
Filed Oct. 6, 1966, Ser. No. 584,725
Int. Cl. G01r 27/02
U.S. Cl. 324—57                    5 Claims

ABSTRACT OF THE DISCLOSURE

A means by which the linearity characteristics of voltage read-out instruments, such as amplifiers, oscilloscopes, ultrasonic cathode ray tube instruments, and like devices may be determined by generating a ramp-like series of pulses each having a fast rise and fall time and equally spaced in time respective to the preceding and ensuing pulses; the pulses varying with time and voltage to form the ramp-like envelope, accomplished by energizing a first monostable multivibrator, energizing a sawtooth generator and an astable multivibrator from the first monostable multivibrator, shaping the pulses from the astable multivibrator by a second monostable multivibrator, mixing the signals resultant from the sawtooth generator and second monostable multivibrator to produce the envelope series of pulses, and introducing these pulses into a read-out instrument. Provision may be made for attenuating the voltages prior to introduction into the read-out instrument, as well as for incorporation of a trigger pulse generator within the test instrument if desired.

---

Figures 1, 2:
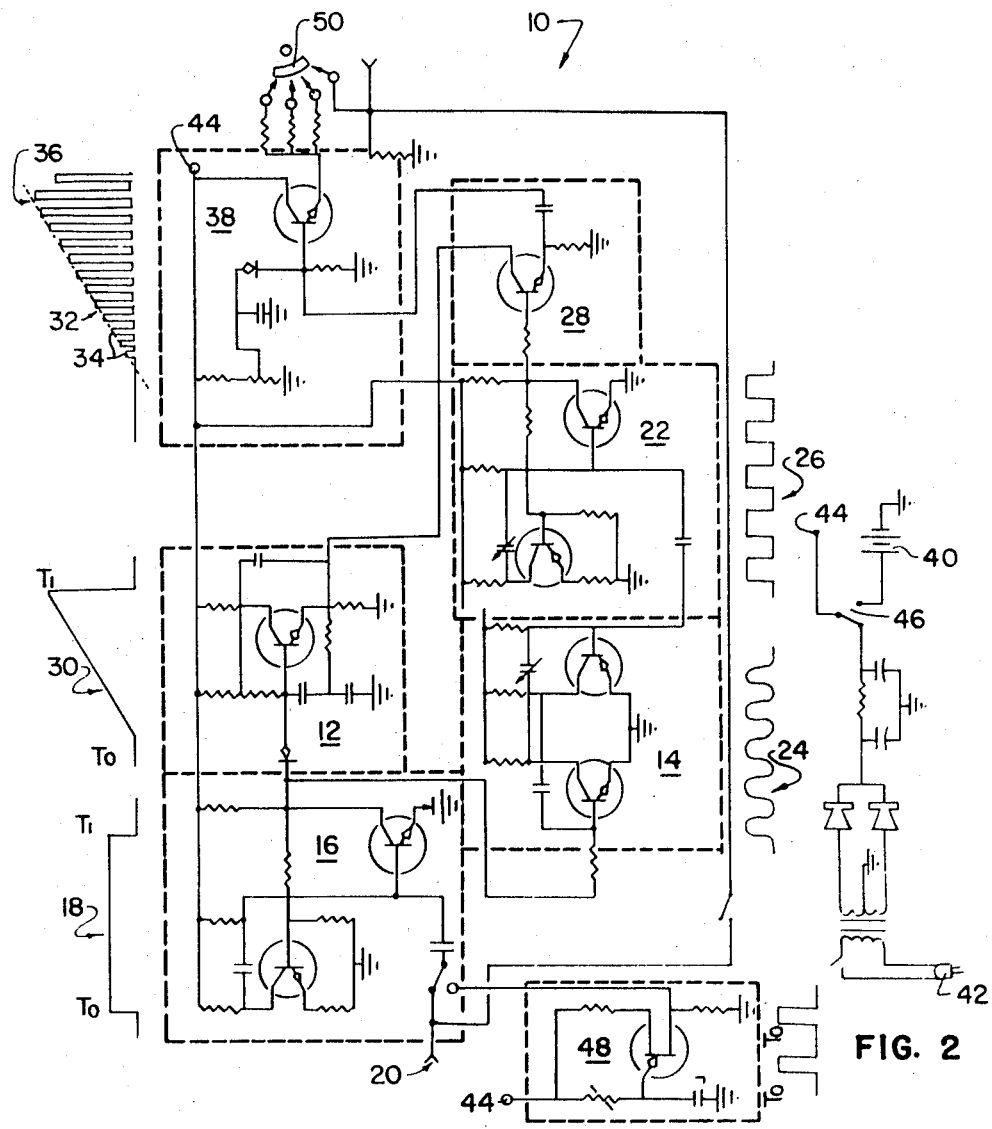

The present invention relates generally to a method and apparatus for determining horizontal and vertical linearity in voltage read-out instruments such as in pulse-echo ultrasonic type instruments.

More particularly, the invention relates to a method and apparatus for the testing, control and standardization of electrical read-out instruments, and particularly to those of the class wherein a voltage display system including cathode ray tube display such as an electronic oscilloscope, is employed for this purpose. This is accomplished in the preferred embodiment by effecting a linear amplification and read-out pattern and displaying these linearity characteristics upon a visual display medium; the tube face of object instrument's cathode ray tube (CRT) being one example.

This predetermined and controlled display is effected in the invented pulse generating circuit configuration, by providing a series of pulses which are progressively and incrementally increased or decreased in amplitude in such manner as to define a ramp-like envelope of pulses which vary with time and voltage; thus displaying the general configuration of a ramp form upon an object read-out medium, such as an analog recorder, digital display device or cathode ray tube to which it is connected, if performance of the object instrument is linear in character.

By thus evaluating the performance characteristics of the object ultrasonic, pulse-echo or other voltage read-out testing system, operational standards may be readily established and precise evaluation and control of the system's combined amplifying and displaying functions, which, in aggregate, define its linearity characteristics, may be effected.

The only other process in the known art that may be employed for the precision testing and calibrating of ultrasonic (CRT) electronic instruments is the so-called "Reflective Ball Immersion System" method which is a multi-ball system; the balls of which have varying diameters. The system has been approved and recommended by the American Society for Testing Materials and the procedure and related apparatus is described in that Society's document ASTM E127–61T in sufficiently adequate detail that it need not be further treated upon herein except to to point out that there exists an excessive requirement upon its operator for use of extreme care and precaution. Such care and precaution must necessarily be exercised in order to assure maximum reflection indication from each of the reflective balls employed in the ASTM procedure and normally it requires that the operator exercise an excessive degree of care and use an inordinate amount of time to perform a single test. For this reason, together with the fact that an expensive immersion tank must be employed as part of the equipment needed, industry, in general, has not, as yet, seen fit to adapt this ASTM test to evaluate their instruments.

It is therefore an object of the present invention to provide an improved method and related apparatus for generating a pulsed voltage of linear, ramp-like display configuration with each pulse having a fast rise and fall time and being equally spaced in time in respect to its preceding and succeeding pulses; each pulse starting at a given voltage level and rapidly changing to a second controlled voltage level.

It is another object of the present invention to provide an improved method and related apparatus for use in determining linearity in both X and Y coordinates of voltage read-out instruments.

Another object of the invention is to provide an improved method and related apparatus for monitoring the pulse peak linearity or non-linearity of voltage read-out instruments whereby precise control of the characteristics of electronic testing systems may be determined and standardization effected therefrom.

A further object resides in the provision of a means and method of the above class and character which has particular novelty and utility in monitoring and displaying the linearity characteristics of a cathode ray tube instrument upon the tube face.

Still another object is to provide a method and apparatus for determining pulse peak linearity of voltage read-out instruments which has substantially universal application for use in testing any cathode ray tube instrument presently known to be commercially manufactured, sold or used.

A yet further object is to provide means and method of the above character that is adaptable, by simple internal adjustment, to be made to function for testing linearity in any ultrasonic pulse-echo or through-transmission type commercial instrument.

A still further object is the provision of the above process and related apparatus that is economical in construction and facile in operation to the extent that neither transmission and receiving characteristics of a transducer nor operator skill are necessary factors to its successful operation and precise evaluation of the linearity characteristics of an object ultrasonic CRT instrument can be made by any unskilled operator in the matter of a few seconds.

Figure 3:
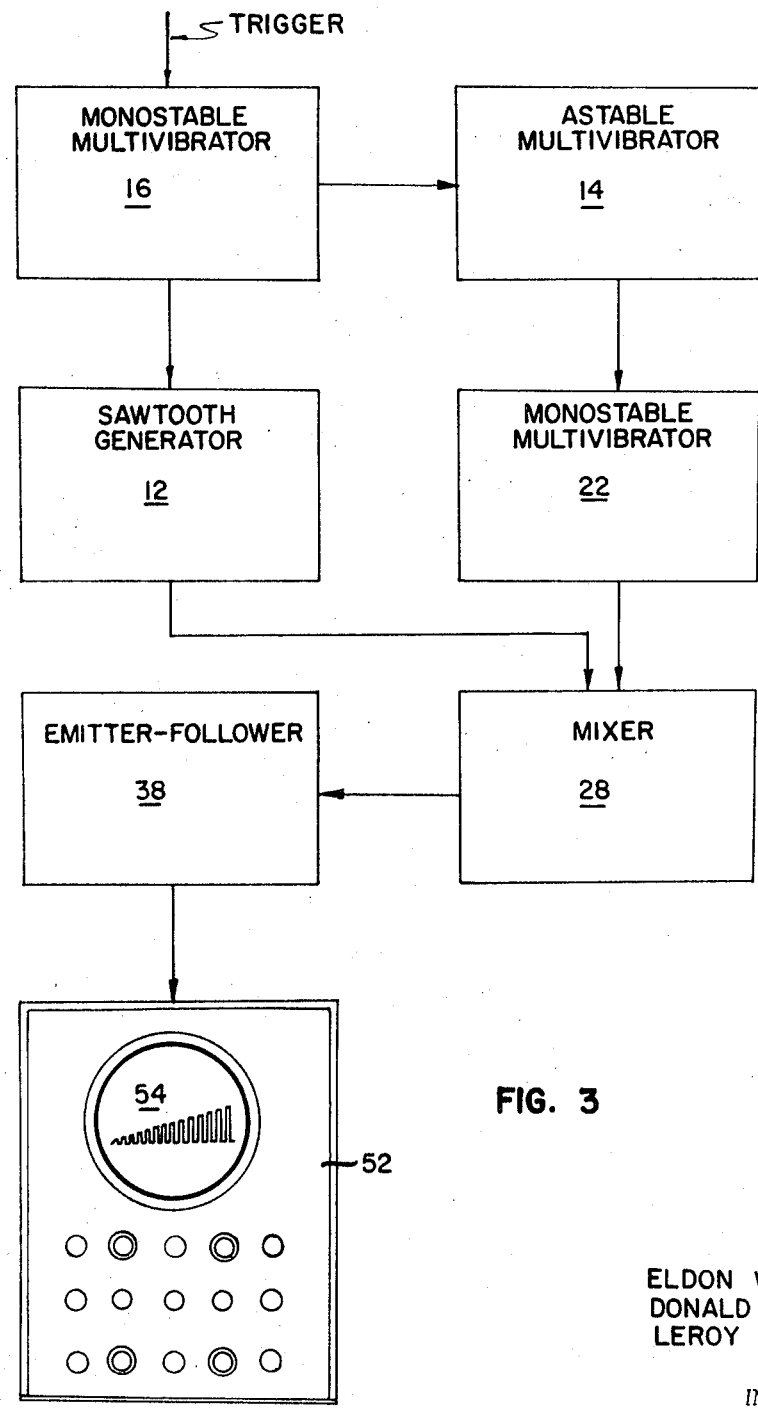

These and other objects and advantages of the invention will become more readily apparent to those skilled in the art from a consideration of the following description and the appended drawings, wherein:

FIGURE 1 is a wiring diagram, having a block form reference, showing the preferred embodiment of the invention;

FIGURE 2 is a schematic diagram of an adaptative power source circuit that may be employed in conjunction with the circuitry of FIGURE 1 to provide an alternate embodiment of the invention; and FIGURE 3 is a pictorial illustration of the novel ramp form read-out pattern and shown as displayed upon the face of an object ultrasonic cathode ray tube instrument and resultant from use of the present invention in making a determination of linearity characteristics of the object instrument.

Referring now to FIGURE 1 of the drawings, the operational sequence and system circuitry employed in the present invention indicated generally at 10, is shown in blocked circuit diagram form and essentially comprises a saw tooth generator 12 and an astable multivibrator 14; both driven by a monostable multivibrator 16 functionally common to each. Multivibrator 16 is energized by a voltage pulse 18 triggered as at 20, or by other appropriate pulse triggering mechanisms. A second monostable multivibrator 22 is operable to receive and shape the output pulses 24 of astable multivibrator 14 as shown by pulse 26, which shaped pulses 26 are fed into a gating-switch mixer 28. Simultaneously, gating-switch mixer 28 receives the saw tooth voltage output 30 from saw tooth generator 12, whereby there is provided a voltage 32 output from gating-switch mixer 28 comprised of a timed series of pulses 34 progressively and incrementally increasing in amplitude so as to assume the desired form of a ramp 36 when displayed upon the read-out face of the object CRT instrument. After being appropriately amplified and emitted through emitter follower 38, and, if desired, effecting matched impedances and/or attenuating the signal through variable attenuator 50, and is directed into an ultrasonic CRT instrument (not shown) for amplification and display thereon. This resultant, the output of which is also a series of pulsed emissions equally spaced in time and increasing with pulse peak linearity, display serves to permit a very accurate determination of the linearity characteristics of the object instruments electronic system. Thus, by providing a means for determining the displaying and amplifying characteristics of an ultrasonic system, standardization and control of the linear characteristics of substantially all such instruments can now be effected.

In operation, the linear ramp generator 10 of the present invention is simply connected to the object electronic instrument or system to be tested (not shown) and the latter energized. It is thereupon automatically synchronized as above noted, with that system and a display appears on the latter's cathode ray tube face or other display medium as may be employed. A trigger pulse 20 having been received from the unit being evaluated, monostable multivibrator 16 is energized and driven to its quasi-stable state sufficient to produce continuous voltage 18 for a preset length of time, as determined by circuit constants. This is normally on the order of 200 microseconds. Voltage 18 is generated by monostable multivibrator 16, and since monostable multivibrator 16 is common to both astable multivibrator 14 and saw tooth generator 12, its output voltage 18 is simultaneously conducted into each of these latter components. As the leading edge of the pulsed voltage reaches saw tooth generator 12, the latter is energized and produces saw tooth voltage 30, resultant from a continuous and uniform rise in voltage amplitude. As soon as the pulse being received ceases, saw toothed generator 12 returns to its deenergized state and the voltage amplitude of 30 returns to zero. This varying, ramp-like pulse 30 is directed into gating-switch mixer 28 where it becomes a response factor in the gating and mixing with another incoming voltage as hereinafter described.

Simultaneously with the above, pulse 18 voltage is conducted from monostable multivibrator 16 into astable multivibrator 14, which has the inherent characteristics of an oscillator by being able to exist in quasi-stable states and being capable of switching rapidly from one state to the other. As long as multivibrator 14 is receiving pulse 18, it is permitted to continuously produce a series of evenly timed, high voltage pulses 24 which are conducted into monostable multivibrator 22, which in turn generates another series of pulses 26, with each new pulse having a very fast rise and fall time for each pulse it receives. This series of high voltage, equally timed pulses 26 is fed into gating-switch mixer 28 which is simultaneously receiving the varying pulse 30 from saw toothed generator 12 as described above. The voltage 30 from saw tooth generator 12 is applied in gating-switch circuit 28 to gate pulses 26 as determined by the voltage rise ramp 30 (saw tooth voltage output) from saw tooth generator 12, resultant in gating and mixing of pulse series 26 from monostable multivibrator 22 and varying ramp pulse 30 from saw tooth generator 12, thus modifying the pulses 26 incrementally into the ramp envelope configuration 36 as shaped by the voltage 30 from saw tooth generator 12. The resultant output through emitter-follower 38 is a series of fast rise time pulses 34, which are equally spaced in time and which start at voltage zero and incrementally increase, with pulse peak linearity, to a maximum voltage.

This pulsed emission is directed into the object ultrasonic CRT instrument for amplification and display on the face of its tube. The system repeats the process each time a trigger pulse initiates a new cycle of pulses.

The hereinabove described method and apparatus is predicated upon the availability of an internal source of power for energizing the linear ramp generator; such power being assumed. However, a simple modification of the apparatus shown in FIGURE 1 may be effected by combining it with the selective power source switching circuitry of FIGURE 2. This provides another embodiment wherein either an internal power source or an external power supply is optionally available. Here battery 40 and 110 v. electrical connector plug 42 are integrated with the circuitry of the instrument of FIGURE 1 by ordinary connection with this system's circuitry at 44. Thus, by the simple expedient of operating switch 46, FIGURE 2, the source of power for operation of the apparatus may be optionally selected by converting from an externally tapped supply, through the medium of socket plug 42, to an internal, integrally contained source, as battery 40, or vice versa.

It is often desirable to check and evaluate the linearity characteristics of amplifiers, oscilloscopes and other units which do not have an integral trigger signal generator as above described. Provision may therefore be made for the $T_0-T_0$ pulse generator 48 to be incorporated as an additional system in a modification of the preferred embodiment as shown in FIGURE 1 the trigger pulse, of course, still coming from the device to be tested. Further, it is sometime desirable, when there is a substantial difference in working amplitudes, or when the object system employs coaxial line conduits, to effect matched impedances. This may be provided by setting the desired level with variable attenuator 50 of emitter-follower 38, FIGURE 1.

While the foregoing disclosure is directed to only preferred embodiments of our invention, it is not to be construed as being limited to such embodiments. Other modifications and embodiments may be readily apparent to those skilled in the art. In this instance, as shown in FIGURE 3, the prestablished voltage linearity of the test instrument 10 (shown schematically) is passed through the electronic system of the object test instrument 52 and the latter's linearity characteristics are read-out or displayed directly on the face of its cathode ray tube 54, or the voltage linearity may be traced upon any analog read-out counter. Therefore, this specification is intended to cover all such changes and modifications to the examples of the invention hereinabove described for the purposes of disclosure, which do not constitute departure from the spirit and scope of the invention.

For example, while a CRT display medium has been mainly employed to describe the invention as shown in FIGURES 1 and 2, an analog recorder or a digital counter may be employed equally well as a read-out or display media when desired as above described.

As thus described, the present invention is characterized by its ability to display horizontal and vertical voltage linearity upon a display medium, introducing a constant, uniformly proportionally changing voltage, which is displayed visually in ramp form to thus establish a voltage linearity of the CRT and its associated electronic circuitry in both X and Y coordinates; the pulses being displayed at a frequency which corresponds to the resolution of the human eye so as to display a stationary series of incrementally rising pulses having a ramp-like form, thereby effecting a straight line through the linear range of the object instrument being evaluated or calibrated.

What we claim is:

1. An electronic test instrument for monitoring and evaluating the linear characteristics of a voltage read-out device to be tested comprising, in combination:
   (a) means responsive to a triggering pulse from the voltage read-out device to be tested generating a ramp-like series of electronic pulses, each pulse having a fast rise and fall time and being equally spaced in time in respect to the preceding and ensuing pulses, each pulse starting at one voltage level and ending at another voltage level so that the pulses vary with time and voltage to form a ramp-like pulse envelope, said means comprising
      (1) a first mono-stable multivibrator component operative to generate a voltage pulse which rises at time zero in synchronism with its trigger pulse and returns to a quiescent state at a time one as determined by circuit constants;
      (2) a saw-tooth pulse generator energized by the $T_0 - T_1$ voltage pulse emitting from said first mono-stable multivibrator, for generating a ramp-like voltage having a constant and uniform rise in voltage amplitude;
      (3) an astable multivibrator in operable communication with said first mono-stable multivibrator, said astable multivibrator on energization by said $T_0 - T_1$ voltage emitting from said mono-stable multivibrator oscillating simultaneously with said saw-tooth generator to produce a continuous series of evenly timed, high voltage pulses;
      (4) a second mono-stable multivibrator operably connected to said astable multivibrator for receiving the series of evenly timed, high voltage pulses emitting from said astable multivibrator and generating in turn a new pulse with a very fast rise time for each pulse received from said astable multivibrator; and
      (5) a mixer operative to mix the signals resultant from said saw-tooth pulse generator and said second mono-stable multivibrator to thereby produce an envelope series of pulses, each pulse of which varies directly with time and voltage;
   (b) emitter means responsive to said pulse-ramp generating means for amplifying voltage output resultant therefrom and emitting it in its linear ramp configuration.

2. The electronic test instrument defined by claim 1, including, in addition, a voltage divider for attenuation of voltages emitted from said emitter means.

3. The method for control and standardization of the display and amplification characteristics of voltage read-out devices, comprising the steps of:
   (a) introducing a triggering electrical voltage pulse from the voltage read-out device into a test apparatus to energize a first mono-stable multivibrator element of a pulse generator circuit system;
   (b) simultaneously energizing a saw-tooth generator and an astable multivibrator driven respectively by time constant pulses generated by and emitting from the triggered mono-stable multivibrator;
   (c) shaping the pulses so generated and emitted by the astable multivibrator by a second mono-stable multivibrator;
   (d) mixing resultant signals from the saw-tooth generator and the mono-stable multivibrator respectively to thereby produce an envelope series of pulses, each pulse of which varies directly with time and voltage;
   (e) introducing the pulse envelope so produced into a read-out instrument thereby establishing the operability and accuracy of the electronic circuitry of the device under test.

4. The method defined by claim 3 wherein introducing the triggering electrical pulse into the test apparatus from the voltage read-out device includes the additional step of generating the triggering pulse within the pulse generator circuit system.

5. The method as defined in claim 3 including the step of attenuating the voltages resultant from the step of mixing the saw-tooth generator signals and mono-stable multivibrator signals prior to introducing the pulse envelope produced thereby into the read-out instrument.

References Cited

UNITED STATES PATENTS

| 2,643,288 | 6/1953 | Philpott | 324—74 XR |
| 2,646,545 | 7/1953 | King | 324—57 |
| 2,906,947 | 9/1959 | Dischert et al. | 324—57 |
| 3,343,100 | 9/1967 | Medina | 328—157 XR |

EDWARD E. KUBASIEWICZ, Primary Examiner

U.S. Cl. X.R.

307—240; 328—157